United States Patent
Johnston

(10) Patent No.: US 12,368,748 B2
(45) Date of Patent: Jul. 22, 2025

(54) MACHINE-LEARNING TECHNIQUES FOR DETECTION OF UNAUTHORIZED ACCESS OF INTERACTIVE COMPUTING ENVIRONMENT FUNCTIONS

(71) Applicant: KOUNT INC., Boise, ID (US)

(72) Inventor: Joshua Michael Johnston, Boise, ID (US)

(73) Assignee: KOUNT INC., Boise, ID (US)

(*) Notice: Subject to any disclaimer, the term of this patent is extended or adjusted under 35 U.S.C. 154(b) by 217 days.

(21) Appl. No.: 18/040,627

(22) PCT Filed: Aug. 4, 2021

(86) PCT No.: PCT/US2021/071104
§ 371 (c)(1),
(2) Date: Feb. 3, 2023

(87) PCT Pub. No.: WO2022/032285
PCT Pub. Date: Feb. 10, 2022

(65) Prior Publication Data
US 2023/0283628 A1 Sep. 7, 2023

Related U.S. Application Data

(60) Provisional application No. 63/061,745, filed on Aug. 5, 2020, provisional application No. 63/061,748, filed on Aug. 5, 2020.

(51) Int. Cl.
*H04L 9/40* (2022.01)
*H04L 41/16* (2022.01)

(52) U.S. Cl.
CPC .......... *H04L 63/1433* (2013.01); *H04L 41/16* (2013.01); *H04L 63/1416* (2013.01)

(58) Field of Classification Search
CPC . H04L 63/1433; H04L 41/16; H04L 63/1416; H04L 63/205; H04L 63/1425; H04L 63/102; G06N 20/00; H04W 12/67
See application file for complete search history.

(56) References Cited

U.S. PATENT DOCUMENTS 7,330,871 B2  2/2008  Barber
11,798,090 B1*  10/2023  Nazir ................. G06N 3/084
(Continued)

OTHER PUBLICATIONS

PCT/US2021/071104, "International Search Report and Written Opinion", Nov. 5, 2021, 14 pages.
(Continued)

*Primary Examiner* — Mohammed Waliullah
(74) *Attorney, Agent, or Firm* — Kilpatrick Townsend & Stockton LLP

(57) ABSTRACT

An online security analysis system determines a categorical value in an online activity and also determines conversion factors that are associated with the categorical value. Based on the conversion factors, the online security analysis system identifies at least one aggregated value for a numerical feature that is associated with previous online activities for the categorical value. In addition, the online security analysis system generates an embedding vector that describes the aggregated value associated with the categorical value. The embedding vector is provided to an online activity analysis model that is trained to generate prediction data for the online activity, based on the aggregated values associated with the categorical value. The prediction data is transmitted to an online system for use in controlling access of a client device to a function of the online system.

17 Claims, 8 Drawing Sheets

(56) References Cited

U.S. PATENT DOCUMENTS

| | | | |
|---|---|---|---|
| 2015/0319185 A1* | 11/2015 | Kirti | H04L 63/1416 |
| | | | 726/23 |
| 2017/0353477 A1 | 12/2017 | Faigon et al. | |
| 2019/0065738 A1 | 2/2019 | Kim et al. | |
| 2019/0164060 A1 | 5/2019 | Gulin | |
| 2019/0164085 A1 | 5/2019 | Gulin | |
| 2022/0020049 A1* | 1/2022 | Rao | G06N 20/00 |
| 2023/0245197 A1* | 8/2023 | Iyer | G06N 7/01 |
| | | | 705/26.7 |

OTHER PUBLICATIONS

Prokhorenkov, et al., "CatBoost: Unbiased Boosting with Categorical Features", 32nd Conference on Neural Information Processing Systems (NIPS 2018), 2018, 11 pages.

Youm, et al., "An Authorized Access Attack Detection Method for Realtime Intrusion Detection System", IEEE 17th Annual Consumer Communications & Networking Conference (CCNC), Jan. 2020, 6 pages.

* cited by examiner

MACHINE-LEARNING TECHNIQUES FOR DETECTION OF UNAUTHORIZED ACCESS OF INTERACTIVE COMPUTING ENVIRONMENT FUNCTIONS

RELATED APPLICATIONS

The present application claims priority to U.S. provisional application Ser. No. 63/061,745 filed Aug. 5, 2020, and to the U.S. provisional application Ser. No. 63/061,748 filed Aug. 5, 2020, each of which is incorporated by reference herein in its entirety.

TECHNICAL FIELD

This disclosure relates generally to security of online environments, in particular to machine-learning techniques to detect unauthorized access requests for functions of online environments.

BACKGROUND

Online computing environments may be exposed to many security risks. For example, malicious entities may use information from legitimate users, such as stolen account information, to perform unauthorized activities in an online computing environment. In an online computing environment, it may be difficult to determine if an activity is generated by a legitimate user of a malicious entity that is using credentials or other information from the legitimate user.

In some cases, a contemporary model may be trained to evaluate activity within an online computing environment. However, as techniques for attempting unauthorized activity evolve, the trained contemporary model may become obsolete, and be unable to accurately interpret new activities in the online computing environment. In addition, a contemporary model may be limited to numeric data related to an activity. For example, the contemporary model may utilize arbitrary values to represent categorical data associated with an activity, such as assigning a serial number to represent an email address. However, the serial number may fail to represent information related to the email address. Based on the arbitrary and non-representative values, the contemporary model may evaluate the request inaccurately or with decreased accuracy.

A contemporary model for evaluating activity within an online computing environment may be unable to analyze information that is associated with an activity in the online computing environment. In addition, frequently re-training a contemporary model based on rapidly changing data, such as for fast-developing areas in online security, may be computationally intensive. Therefore, the contemporary model may have poor accuracy at evaluating activities in the online computing environment.

SUMMARY

According to certain embodiments, an online security analysis system implements a method that includes identifying a set of conversion factors for a categorical value. The categorical value is associated with an access request that is from a client device and to an online system. The set of conversion factors is determined based on historical data associated with past access requests having the categorical value. The method includes identifying, based on the set of conversion factors, an occurrence feature and an aggregated feature. The occurrence feature is related to occurrences of the categorical value. The aggregated feature is related to aggregated values of a numerical feature of the past access requests. The method includes generating an embedding vector that includes the occurrence feature, the aggregated feature, and a present numerical value of the numerical feature. the present numerical value is associated with the access request. The method includes applying a machine-learning model to the embedding vector. The machine-learning model is configured to generate, based on the embedding vector, prediction data that is associated with the access request. The method includes transmitting the prediction data to the online system for use in controlling access of the client device to a function of the online system.

According to certain embodiments, a system comprises a processing device and a memory device in which instructions executable by the processing device are stored for configuring the processing device. The processing device is configured for identifying a conversion factor for a categorical value. The categorical value is associated with an access request that is from a client device and to an online system. The conversion factor is determined based on historical data associated with past access requests having the categorical value. The processing device is configured for modifying the conversion factor to include an occurrence feature. Modifying the conversion factor is responsive to one or more of receiving an updated classification for the access request, or determining that a quantity of the access request combined with the past access requests exceeds a threshold quantity of access requests. The occurrence feature describes occurrences of the categorical value in the access request combined with the past access requests. The processing device is configured for receiving an additional access request having the categorical value. The additional access request is from the client device and to the online system. The processing device is configured for generating an embedding vector that includes the occurrence feature of the modified conversion factor. The processing device is configured for applying a machine-learning model to the embedding vector. The machine-learning model is configured to generate, based on the embedding vector, prediction data that is associated with the additional access request. The processing device is configured for transmitting the prediction data to the online system for use in controlling access of the client device to a function of the online system.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings, where.

DETAILED DESCRIPTION

Figure 1:
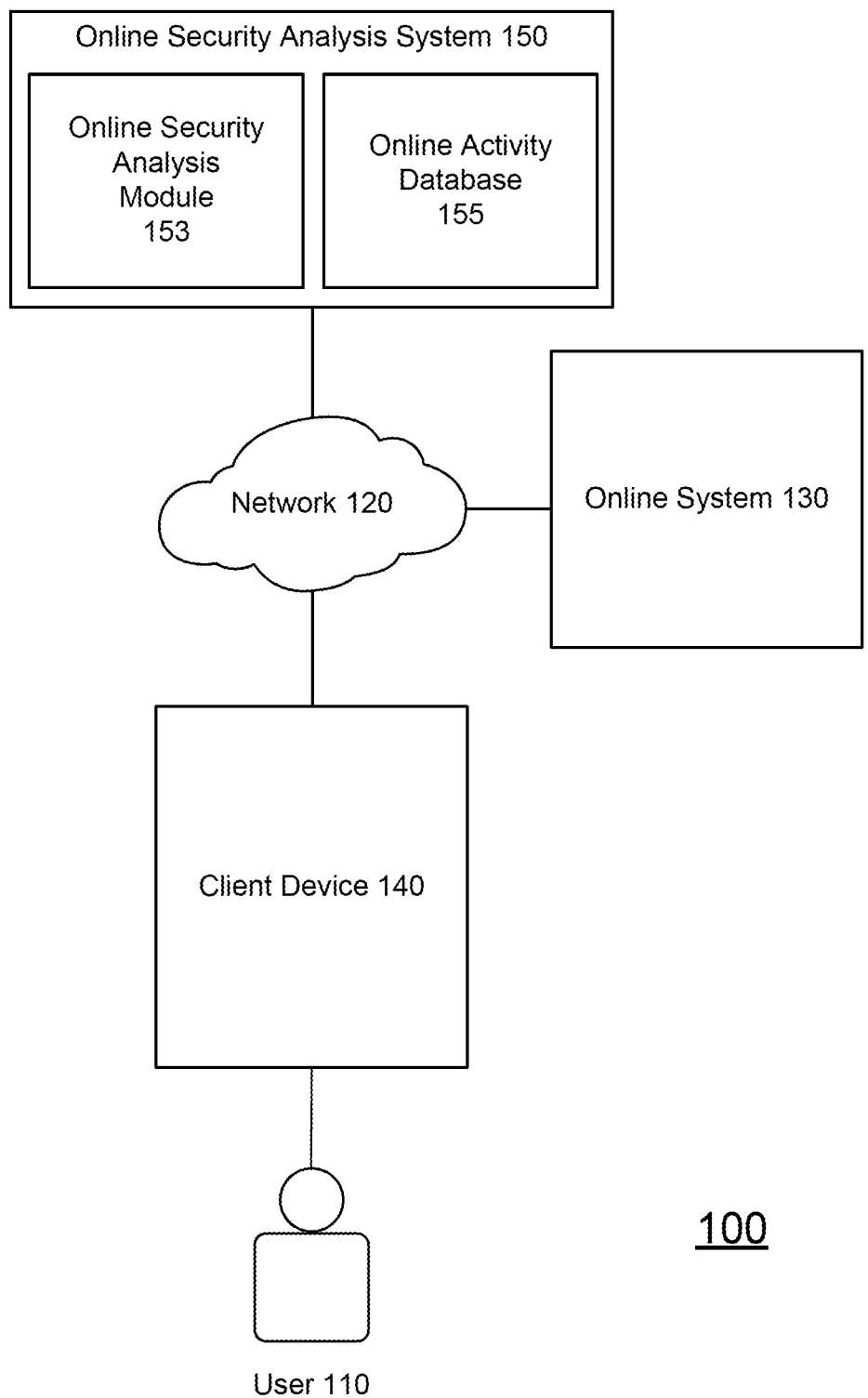
FIG. 1 illustrates a computing environment of a system for analyzing online activity, according to some embodiments.

Various aspects described herein involve evaluating online activities in an online computing environment via machine-learning models. Activities may be generated by legitimate users, such as visitors to a website or users who wish to download digital content. In addition, activities may be generated by malicious entities, such as nefarious users using hijacked accounts or legitimate user's identities, hijacked computer systems, automated computer programs (e.g., bots), or other types of malicious entities. The online activities may include requests from client devices for accessing functions of the online computing environment. An online security analysis system may be employed to evaluate the online activities, such as the requests to access the functions. The online security analysis system may be configured to generate prediction data that indicates whether a particular online activity is likely to be an activity by a legitimate user or an unauthorized activity that is associated with a malicious entity.

In some examples, the online security analysis system may employ an online activity analysis model, such as a machine-learning model, to analyze an online activity, such as an access request. The model may perform analysis based on information included in the access request. In some cases, the online activity analysis model incorporates data about access requests that are received after training of the online activity analysis model. For example, the online security analysis system may be configured to generate or modify an embedding vector for a recent online activity, such as modifying the embedding vector based on historical access requests that are received after training of the online activity analysis model. In addition, the online activity analysis model may analyze additional online activities based on the updated embedding vector without retraining the model.

In addition, the example online security analysis system may generate data that represents categorical data values associated with an online activity. The generated data may be representative or non-arbitrary data values. In some cases, the generated data may be one or more features that represent a relationship among multiple access requests that include a particular value of a categorical feature. For example, the example online security analysis system may generate a counted categorical value that describes a combination (e.g., a count, a sum, a concatenation) of occurrences of the particular categorical value. In addition, the example online security analysis system may generate an occurrence ratio that describes a relationship among the occurrences, such as a ratio of unauthorized occurrences of the particular categorical value to total occurrences of the particular categorical value. In some cases, an occurrence feature may describe a counted categorical value, an occurrence ratio, or both. In addition, the example online security analysis system may generate an aggregated numerical value that describes a combination (e.g., a sum, a total, a product) of numerical values that are associated with the particular categorical value. In addition, the example online security analysis system may generate an aggregated value ratio that describes a relationship among the numerical values that are associated with the particular categorical value, such as a ratio of IP distances for unauthorized occurrences of the particular categorical value with IP distances for total occurrences of the particular categorical value. In some cases, an aggregated feature may describe an aggregated numerical value, an aggregated value ratio, or both.

Some examples described in the present disclosure contemplate a discrete set of information obtained for an online activity. The information may collectively include data such as information or characteristics describing the physical device performing the online activity, location or address (e.g., physical or electronic), active online accounts during or proximate to the online activity, a function requested via the activity (e.g., a request to access a website, a request to download digital content). Within the online activity information, there may exist a variety of data that can be broken down into unique identifiers and contextual information.

Generally, unique identifiers (unique IDs) are irreducible characteristics associated with an online activity and often correspond to a single audience member while the contextual information provides supplementary details about the activity performed. In some cases, unique identifiers may be described as categorical features that include multiple categorical values, such as a categorical feature of "email address" having unique categorical values such as "person1@domain1.com" or "person2@domain2.org." In some cases, categorical values may provide limited amounts of information when being evaluated by a machine-learning model. For example, an email address may provide information about a username and a domain name associated with the email address. However, the email address itself may not provide any meaningful information about how the email address is being used, e.g., whether the email address is being used by a legitimate user or an unauthorized entity.

Some examples of unique identifiers associated with the physical device within the online activity information include a user account with the device (device UID), media access control (MAC) address, Internet protocol (IP) address, a cookie value (e.g., associated with a web browser or web page), or other suitable types of unique identifiers for a physical device. Some examples of unique IDs associated with online accounts or the activity performed include registered user account names and passwords, email address, credit card or bank account numbers, shipping or billing addresses, online payment accounts, or other suitable types of unique identifiers for an online account or activity. In some cases, a unique ID of a device, online account, or activity may be represented by a hash or another suitable technique to anonymize a unique ID.

Some examples of contextual information include domain name, timestamps, Uniform Resource Locator (URL) and keywords associated with activity, hardware configuration or settings of the device such as time zone or language, application or operating system identifier, device type, Internet protocol (IP) address, available networks (wired and wireless), application preferences, nicknames, dates of birth and device location. Contextual information may also include device capabilities such as connection speed or connection strength, GPS, radiation, audio or video capture and other sensors.

The unique identifiers and the contextual information can be used to determine a likelihood that an online activity is unauthorized. For example, if a specific IP address was included in a large number of online activities, then if a new online activity that includes that IP address is received, there is a significant likelihood that the online activity was unauthorized. The unique identifiers and the contextual information can be provided to a model that was trained using information for previously received online activities.

In some cases, a machine-learning model may typically operate by manipulating numerical values. As such, it is may be advantageous to convert categorical values into a numerical representation to allow the machine-learning model to operate upon the numerical representation of the categorical value. Moreover, instead of assigning arbitrary values to each categorical value, it may be advantageous to assign numerical values in a meaningful way to allow the numerical representation for a categorical value to provide meaningful information about the categorical value.

In some cases, contemporary machine-learning models may have limited accuracy, due to the training data used to create them. As time passes, the data used to train a machine-learning model may become obsolete, reducing the accuracy of the model. For example, in machine-learning models configured to identify unauthorized online activities, if internet traffic is received from an address that has never been seen before, a model may have no information regarding the newly seen address. In addition, the contemporary machine-learning model may not be able to properly determine if online activities received from the newly seen address are fraudulent or unauthorized. To mitigate the effect of obsolete data, a contemporary machine-learning model may be periodically re-trained to allow it to incorporate newly gathered information. However, re-training a machine-learning model may be computationally intensive. In addition, if the dataset is constantly changing at a fast pace, such as in the field of detecting unauthorized online activity, having to re-train a model at a frequency that will allow the model to stay up-to-date may be prohibitively expensive (e.g., in terms of computational power and time). Retraining too frequently may also result in reinforcing existing model behavior, particularly in a domain like unauthorized online activity where survivorship bias prevents collecting a supervisory signal on denied online activities.

Certain aspects described herein, such as techniques to generate embedding vectors based on incremented or aggregated conversion factors, provide improvements for determining unauthorized online activity. For example, existing analysis systems may fail to incorporate data that is received after a training phase of a machine-learning analysis model. By contrast an online security analysis system as described herein may modify an embedding vector to incorporate information about recent (e.g., post-training) online activities in addition to past (e.g., pre-training) online activities. Based on the modified embedding vector that incorporates the newly received information, an online activity analysis model may determine prediction data with higher accuracy. The described online security analysis system may generate or modify a specialized data structure using the information, such as an embedding vector, a conversion factor, or a conversion table that stores a set of conversion factors. In addition, the described online security analysis system may generate an additional specialized data structure, such as an embedding vector based on the data incorporated into the conversion factors. The described online security analysis system may use the embedding vector to analyze the recent online activity. By utilizing an incremented conversion factor to generate an embedding vector for each received online activity, the described online security analysis system may determine unauthorized online activity with improved accuracy. For example, a model included in the described online security analysis system may analyze a newly received online activity using the embedding vector that describes relationships between the newly received online activity and multiple additional online activities that have been previously received. In some cases, the described online security analysis system may generate one or more of the embedding vector, conversion factor, or conversion table based on specialized rules, such as computer-implemented rules that identify relationships between a newly received online activity and multiple additional online activities that have been previously received.

In some cases, the described online security analysis system may include an online activity analysis model that is trained according to contemporary training techniques. Based on inputs that include the embedding vector or a set of conversion factors described above, the trained online activity analysis model may identify unauthorized online activity with improved accuracy, as compared to a contemporary analysis model that is unable to use the embedding vector or conversion factors. For example, the contemporary model may be trained or re-trained periodically, using training data that describes a group of historical activities. However, as techniques for attempting unauthorized access evolve, the training data may become obsolete. To mitigate this, the contemporary model may be periodically re-trained to incorporate additional data about unauthorized access attempts. However, re-training a model may be computationally intensive. In addition, if the dataset, such as in the field of network security, is constantly changing at a fast pace, having to re-train a model at a frequency that will allow the model to stay up-to-date may be prohibitively expensive (e.g., in terms of computational power and time). Retraining the contemporary model too frequently may also result in reinforcing existing model behavior, and may fail to improve model accuracy for determining changing techniques for attempting unauthorized access.

System Environment

FIG. 1 illustrates a computing environment of a system for analyzing online activities, according to some embodiments. The computing environment may include a network 120, an online security analysis system 150 having an online security analysis module 153 and an online activity database 155, an online system 130, and a client device 140 used by a user 110 for accessing the online system 130. While only one online system 130 and the client device 140 are illustrated in FIG. 1, other embodiments contemplate many online systems and vast numbers of client devices that access content from one or more of the online systems. Additionally, functionality of the online security analysis system 150 may be incorporated directly into the online system 130 or vice versa.

The client device 140 may include one or more computing devices capable of receiving user input as well as transmitting and/or receiving data via the network 120. In some embodiments, the client device 140 may be a conventional computer system, such as a desktop or a laptop computer, a device having computer functionality, such as a personal digital assistant (PDA), a mobile telephone, a smartphone, or another suitable device. The client device 140 may be configured to communicate via the network 120. In some embodiments, the client device 140 may execute an application allowing a user of the client device 140 to interact with the online system 130. For example, the client device 140 may execute a browser application to enable interaction between the client device 140 and the online system 130 via the network 120. In another embodiment, the client device 140 may interact with the online system 130 through an application programming interface (API) running on a native operating system of the client device 140, such as IOSC) or ANDROID™.

The client device 140 may be configured to communicate via the network 120, which may include any combination of local area and/or wide area networks, using both wired and/or wireless communication systems. In some embodiments, the network 120 may use standard communications technologies and/or protocols. For example, the network 120 may include communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 may include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

In some embodiments, one or more accounts may be associated with the client device 140. In some embodiments, the accounts are linked to specific online systems. For example, an account may include user credentials for accessing an online system. In other embodiments an account may be associated with offline services. For example, an account may be a credit card account provided by a credit card issuing institution. In some embodiments, multiple accounts may be used in conjunction with a single client device 140. For instance, multiple accounts may be used in conjunction with the client device 140. Moreover, in some embodiments, multiple client devices 140 may be used by a single user 110. For instance, the user 110 may access online system 130 using the client device 140 and one or more additional client devices.

The online system 130 may implement functions such as providing consumable media content and online services over the network 120 to the client device 140. For example, the online system 130 may provide data (e.g., a web page, search results, text, images, video content, audio content), fulfill an online transaction, authenticate a user ID or device, or perform other functions responsive to information received from the client device 140. In one example, the online system 130 may provide an interface (e.g., a website, web server, or other server) to provide the client device 140 with access to certain online functions, to engage in online transactions with the user 110, to provide the client device 140 with controlled access to electronic content, etc. The online system 130 may transmit data to and receive data from the client device 140 to enable or prevent access to a function of the online system 130. Examples of accessing a function include, but are not limited to, accessing sensitive data from an access-controlled data source, completing a purchase via an e-commerce service, using a particular feature of an online software tool, etc.

In some cases, the online system 130 may determine information about online activities. In additional or alternative aspects, the online system 130 may store records corresponding to online activities between the online system 130 and client device 140. In some cases, a data collection module included in the online system 130 may perform operations related to determining or storing information. Online activity information can include unique identifiers and contextual information associated with the activity such as client device hardware or software identifiers, or information identifying an active or authenticated online accounts maintained by the online system 130 or a third-party system. The online system 130 may transmit the online activity information to the online security analysis system 150 for analysis and processing.

In some embodiments, the online system 130 may hash or encrypt portions of the online activity information to protect sensitive user data prior to transmission to the online security analysis system 150. In some embodiments, if the online activity information is encrypted, the decryption key and encryption function may be provided to the online security analysis system 150 to allow the online security analysis system 150 to decrypt the online activity information. In other embodiments, the online system 130 may provide to the online security analysis system 150 a hashed version of the online activity information to anonymize the information. For instance, the online system 130 may provide a hashed version of an email address using a predefined cryptographically secure hashing algorithm. The online system 130 may provide the hashed email address to the online security analysis system 150. In some cases, the same hashed value may be generated each time the same online activity information is hashed using the cryptographically secure hashing algorithm. As such, the online security analysis system 150 may track information about the online activity without the online system 130 revealing the identity of the user or account associated with the online activity. Moreover, if multiple online systems use the same hashing algorithm to anonymize the online activity information, the online security analysis system 150 may track information across the multiple online systems without compromising the sensitive data or the privacy of the users accessing the online systems.

In some embodiments, the online system 130 may include a description of the online activity information that corresponds with hash values to aid in analysis. For example, the description of variable, user defined data such as passwords or user names may indicate the number of characters hashed (e.g., four, six or eight) and an extraction paradigm (e.g., first four, last six, middle eight or all). For instance, if the online activity information corresponds to the last four digits of a credit card number, the online activity information may include a description that indicates this. Further, the online system 130 may produce a variety of hash values from a single password or user name based on the application of multiple extraction paradigms to facilitate comparisons with hash values from other online system that have varying password and user name requirements.

Figure 2:
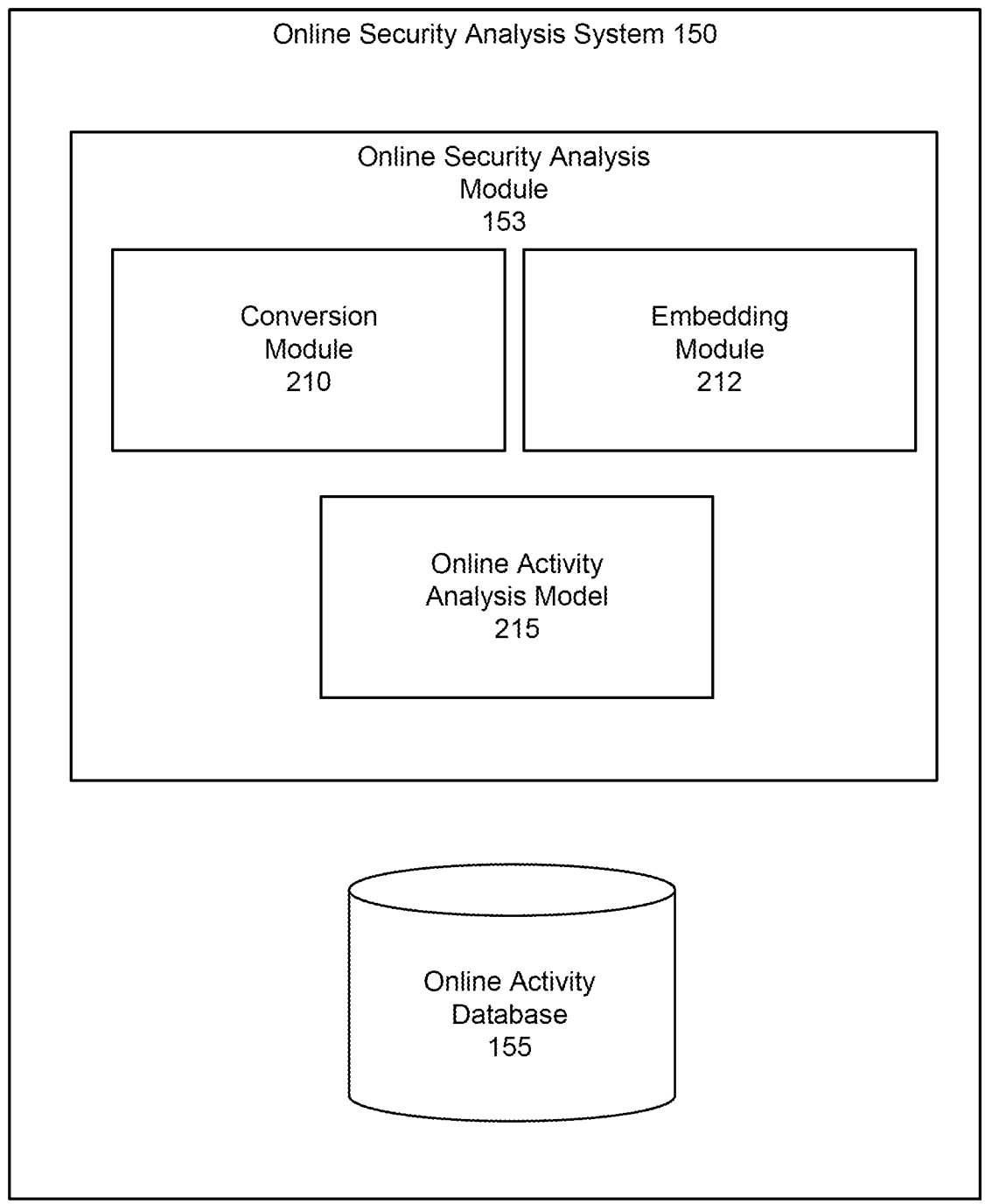
FIG. 2 illustrates a block diagram of an online security analysis system, according to some embodiments.

FIG. 2 illustrates a block diagram of the online security analysis system 150, according to some embodiments. The online security analysis system 150 may include the online security analysis module 153 and the online activity database 155. In some cases, the online security analysis system 150 may analyze one or more categories of online activity. For example, the online security analysis system 150 may analyze or store information about online requests to access one or more functions of an online computing environment, e.g., the online system 130. The access requests can include requests for account changes, login requests to a website (or other online resources), requests to purchase an item via an online web portal, requests to download digital media content (e.g., streaming audio and/or video content), or other types of access requests for functions of an online computing environment.

The online activity database 155 may receive and/or store online activity information from online system 130, such as information about access requests. The online activity database 155 may additionally store information that is determined about the access requests, such as information determined by the analysis module 153. For example, the online activity database 155 may store a determined likelihood that a particular access request is unauthorized. In some embodiments, the online activity database 155 may store online activity information that is received from the online system 130. Moreover, the online security analysis system 150 may modify the stored online activity information based on additionally received information from the online system 130 or a third-party system. For example, the online activity database 155 may store information about an access request that is received from the online system 130. The online activity database 155 may modify the information to indicate that the access request was unauthorized, such as based on an indication received from the online system 130 or a third-party system. Example indications of unauthorized online activities can include a request to change a password, an alert about a hijacked account, a charge back requested for an online transaction, or other suitable indications of unauthorized online activity.

The online security analysis module 153 analyzes online activities to determine a likelihood that the online activities are unauthorized. The online security analysis module 153 includes a conversion module 210, an embedding module 212, and an online activity analysis model 215. The conversion module 210 converts categorical values for one or more categorical features identified in an online activity to one or more numerical values. The embedding module 212 determines an embedding vector for an online activity being analyzed based on information associated with the online activity. In some embodiments, one or more of the conversion module 210 or the embedding module 212 converts a categorical value for a categorical feature into a numerical value to generate a feature vector or an embedding vector to be used with a trained model. For example, the conversion module 210 converts an email address associated with the online activity or a location where the online activity originated into a numerical value to generate the feature vector for the online activity. Additionally or alternatively, the embedding module 212 converts a categorical value, such as the email address or location associated with the online activity, into a numerical value to generate the embedding vector for the online activity. In addition, the embedding vector may include additional values (e.g., vector values) that represent characteristics of one or more online activities. For example, the embedding vector may include vector values that encode characteristics of multiple access requests, such as historical access requests previously received by the online security analysis module 153. The encoded characteristics may include information extracted from access requests, such as, for instance, categorical values (e.g., for one or more categorical features), numerical values (e.g., for one or more or more numerical features), aggregated values, counted values, or other values or features for an online activity (or group of online activities). In some examples, the embedding vector includes values that represent occurrence features or aggregated features that are associated with one or more categorical values. In some examples, the embedding vector also includes values representing the unique identifiers and contextual information of online activities (e.g., access requests) discussed above.

In some embodiments, the categorical value is converted to one or more numerical values based on a set of one or more conversion factors, such as a conversion factor stored in a conversion table. The conversion table may be maintained by the conversion module 210, the embedding module 212 or both. In some cases, the conversion table may include multiple conversion factors, such as a set of conversion factors via which a categorical value may be converted to a numerical value. In some cases, a conversion factor may describe an operation that may applied to a categorical value, such as an operation to transform (e.g., hash, encrypt) the categorical value to another value. In additional or alternative aspects, a conversion factor may describe a modification that may be applied to the categorical value based on an additional value that is included in the associated online activity, such as by identifying a numerical value associated with the online activity and substituting, concatenating, or otherwise modifying the categorical value based on the numerical value. In additional or alternative aspects, a conversion factor may describe a conversion that is based on additional online activities, such as a group of online activities that are each associated with the categorical value (e.g., have a same email address). For example, the conversion from the categorical value to the numerical value may be based on an aggregation of a numerical feature that was associated with one or more online activities received by the online security analysis system 150, such as an aggregated numerical feature that is identified by the conversion module 210. Each time a new online activity is received, the conversion module 210 may identify the categorical values associated with the activity, extract the numerical value for the tracked numerical feature from the activity and modify the aggregation associated with the identified categorical values based on the extracted numerical feature. In additional or alternative aspects, the conversion from the categorical value to the numerical value may be based on a total count of occurrences that the categorical value was included in online activities received by the online security analysis system 150, such as a total occurrence count that is identified by the embedding module 212. Each time a new online activity is received, the embedding module 212 identifies the categorical values associated with the online activity and increments the count for the identified categorical values.

In some cases, categorical features associated with an online activity may include one or more of an email address, a domain name of the email address, an IP address that originated the online activity, characteristics of the device used in the online activity (e.g., operating system, model, manufacturer, language settings, screen resolution, internet connection type), a country or city of origin of the online activity, contents of a "shopping cart" function, currency value of a purchase activity, a national currency used to pay for a purchase activity, a type of payment or characteristics of the entity issuing payment credentials used in a purchase activity, identifying elements of an individual executing the online activity (e.g., phone number, email address, physical address, name), a time of day at the location where the online activity originated, or other suitable categorical features of an online activity.

Additionally or alternatively, numerical features associated with an online activity may include one or more of a currency amount (e.g., a dollar amount) of a transaction described by the online activity, a total number of items (e.g., downloads, purchased items) described by the online activity, a number of distinct items described by the online activity, an amount of tax, a distance from a billing address to a shipping address, a distance from a device location to a shipping or billing address, a distance from a proxy location to a device location, or another numerical feature that has a value suitable for aggregation (e.g., a value greater than 1, a value that is variable among online activities). In some cases, the numerical feature may be a combination of numerical features, such as any combination of the example numerical features or additional suitable numerical features.

In some embodiments, each time a new online activity is received, the conversion module 210 identifies one or more values that may be updated for one or more categorical features associated with the online activity. For example, if a new access request is received that identifies categorical values for an email address of customer@domain.com and an originating IP address located in the United States, the values associated with one or more categorical features may be updated, such as values respectively associated with the email address customer@domain.com, the domain domain-.com, the particular originating IP address, a group of originating IP addresses in the United States, or other suitable values. In some cases, a counted categorical value may indicate a count of how many occasions (e.g., in incoming access requests) a particular categorical feature has a particular categorical value. For example, if the online security analysis system 150 has received online activity information indicating that fourteen previous access requests had the categorical value of customer@domain.com, and that the example access request has the same categorical value of customer@domain.com, the counted categorical value associated with the email address customer@domain.com may be incremented (or otherwise modified) to indicate a counted categorical value (e.g., a count) of fifteen. In some cases, the counted categorical value may be included in an occurrence feature.

In some cases, the conversion module 210 identifies, in a received online activity, a numerical feature that can be aggregated within a group of online activities associated with a particular categorical value. The conversion module 210 may convert the particular categorical value to a first numerical value that is an aggregation of values for the numerical features. For instance, continuing with the example access request described above, the access request may indicate a billing address and a shipping address, e.g., indicated by a transaction described by the access request. In addition, the conversion module 210 may identify a shipping distance associated with the access request, such as quantity of kilometers (or other measurement) between the billing and shipping addresses. In some cases, a numerical value of the shipping distance may be aggregated with additional numerical values of additional shipping distances. For example, the aggregated numerical value of the shipping distance may indicate a total number of kilometers described by multiple access requests. In some cases, the aggregated numerical value may be included in an aggregated feature. In some cases, the aggregated numerical value is associated with a particular categorical value, such as an aggregated shipping distance value among multiple access requests associated with the email address customer@domain.com. The particular categorical value may be converted based on the aggregated numerical value, such as via a conversion factor that indicates the aggregated shipping distance (or other suitable aggregated numerical value). In some cases, an aggregated numerical value may indicate a total (or other aggregation type) quantity of numerical values for a particular numerical feature. For example, if the online security analysis system 150 has received online activity information indicating that the fourteen previous access requests with the categorical value of customer@domain.com had an aggregated shipping distance value of 1000 km, and that the example access request has a shipping distance value of 100 km, the aggregated shipping distance value associated with the email address customer@domain.com may be summed (or otherwise aggregated) to indicate an aggregated numerical value of 1100 km.

In some cases, one or more categorical values or numerical values (including counted or aggregated values) may be updated based on the information included in the example access request, derived through reference lookups from the information included in the access request, and the outcome of the online security analysis system evaluation of the access request.

In some embodiments, the conversion module 210 may convert the categorical value to a second numerical value that is a ratio of a particular numerical feature within a group of online activities associated with the categorical value, such as a ratio describing a particular numerical feature of past access requests. For example, a conversion factor may substitute (or otherwise modify) the categorical value with the second numerical value. The second numerical value may include a ratio between the aggregation of the particular numerical feature included in online activities deemed to be legitimate and the total aggregation of the particular numerical feature (including legitimate and unauthorized activities). In addition, the second numerical value may include a ratio between the aggregation of the particular numerical feature included in online activities deemed to be unauthorized and the total aggregation of the particular numerical feature (including legitimate and unauthorized activities). Further, the second numerical value may include a ratio between the aggregation of the particular numerical feature included in online activities deemed to be legitimate and the aggregation of the particular numerical feature included in online activities deemed to be unauthorized. For example, the online security analysis module 153 may determine numerical values for an IP distance, such as a distance between a geographical location of the originating IP address of each access request and a geographical location of the online system 130. The numerical values for the IP distances may be associated with a particular categorical value, such as a particular email address included in the access requests. In addition, the conversion module 210 may determine a ratio between the aggregated IP distance of all legitimate access requests associated with the particular email address and a total aggregated IP distance of all access requests associated with the particular email address. In some embodiments, the second numerical value may be a ratio between the aggregation of a particular numerical feature included in online activities deemed to be unauthorized and the total aggregation of the particular numerical feature (e.g., including legitimate and unauthorized access requests).

In some embodiments, the conversion module 210 may convert the categorical value to a third numerical value based on a frequency of occurrences of a categorical value within a group of online activities associated with the categorical value, such as a ratio describing the categorical value associated with a particular access request. For example, a conversion factor may substitute (or otherwise modify) the categorical value with the third numerical value.

The third numerical value may be based on a frequency of occurrences in which the categorical value was included in an unauthorized access request received by the online security analysis system 150. For example, each time the online security analysis system 150 receives an indication that a previously received access request was unauthorized, the conversion module 210 may update the conversion table to increment the frequency of the categorical value associated with the access request. In addition, one or more conversion factors may be updated to increment (or otherwise modify) a ratio or aggregated value that described unauthorized instances of the categorical value, such as the first numerical value, second numerical value, third numerical value, or other values described herein. In some cases, the frequency may be calculated as a ratio between a quantity of occurrences that a categorical value was included in online activities identified as being unauthorized and a total count of occurrences that the categorical value was included in online activities received by the online security analysis system 150.

In some embodiments, the conversion module 210 may convert a categorical value to a fourth numerical value that is a ratio (or other relationship) between the aggregation of two numerical features within a group of online activities associated with multiple categorical values, such as a ratio describing one or more numerical features of past access requests. For example, the fourth numerical value may be a ratio between a total aggregated currency amount associated with a particular categorical value and an aggregation of currency amounts included in online activities associated with one or more additional categorical values. In some cases, the online security analysis module 153 may identify relationships among aggregated numerical features that are associated with multiple categorical values. For example, a first email address may be associated with a small number of access requests, where each access request describes an online transaction with a high currency amount. In addition, a second email address that is associated with a large number of access requests, each describing an online transaction with a small currency amount. The first email address and the second email address may have a similar aggregation value. In some cases, converting the categorical values, e.g., the first and second email addresses, to the second numerical value allows an online security analysis system to differentiate these example scenarios. For example, a first aggregation value (e.g., sum of currency amounts) of the small number of high-currency amount access requests may be approximately equivalent to a second aggregation value of the large number of small-currency amount access requests. A ratio of the first aggregation value to the small number of access requests may be different from a ratio of the second aggregations value to the large number of access requests, e.g., a ratio of currency-per-request is different between the first and second email addresses.

In some cases, the conversion module 210 may apply multiple conversion factors to a categorical value. For example, the conversion module 210 may determine that a particular categorical value is associated with the first, second, and third numerical values described above. In addition, the conversion module 210 may generate a data structure, such as a vector of values, that concatenates (or otherwise includes) the first, second, and third numerical values with the particular categorical value. In some cases, the data structure generated based on the multiple conversion factors is included in an embedding vector, e.g., that is generated by the embedding module 212. In additional or alternative aspects, one or more conversion factors may be stored in an additional data structure, such as a set of conversion factors stored in a conversion table. the set of conversion factors may be stored as a vector, an array, a list, or any other suitable type of data structure.

In some embodiments, the indication that a previously received online activity was unauthorized may be received as a result of a manual review of the online activity. For example, a manual review may be performed responsive to receiving a report for a chargeback associated with the online activity, a refund process being initiated by a customer, or a report declining a transaction associated with the online activity, a report of fraud from the customer, or other suitable indications to initiate a manual review.

In some embodiments, the embedding module 212 may update the frequency to reflect whether an online activity was legitimate or unauthorized after a predetermined amount of time has passed since the online activity was received by the online security analysis system 150. For example, if an indication that an online activity was unauthorized is not received within a predetermined amount of time (e.g., 2 weeks), embedding module 212 may decrement a frequency associated with unauthorized instances of the categorical value included in the online activity. Conversely, if an indication that the online activity is unauthorized is received within the predetermined amount of time, the embedding module 212 may increment the frequency associated with unauthorized instances of the categorical value included in the online activity. In some embodiments, if an indication that an online activity is unauthorized is received after the predetermined amount of time has expired, the embedding module 212 may update the frequency associated with unauthorized instances of the categorical value included in the online activity to reflect that the online activity was unauthorized and not legitimate. In some cases, the embedding module 212 may perform multiple updates of frequencies associated with legitimate or unauthorized instances of the categorical value, such as if an online activity previously indicated as legitimate (or unauthorized) receives an additional indication of being unauthorized (or legitimate).

In some embodiments, the embedding module 212 may modify the frequency based on a likelihood that an online activity is unauthorized. For instance, if the online security analysis module 153 determines that an access request is likely to be unauthorized, the embedding module 212 may increment the frequency associated with the categorical value included in the access request. Moreover, if after a predetermined amount of time, an indication that the access request was unauthorized is not received, or if an indication that the access request was not unauthorized is received, the embedding module 212 may update the frequency to reflect this new information. Conversely, if the online security analysis module 153 determines that an access request is likely not to be unauthorized, the embedding module 212 may decrement the frequency associated with the categorical value included in the access request. Moreover, if an indication that the access request was unauthorized is subsequently received, the embedding module 212 may update the frequency to reflect this new information.

In some embodiments, the embedding module 212 may use a sliding window to remove or diminish the influence of old online activities. For example, the embedding module 212 may update the conversion table to remove the contribution from online activities older than a particular amount of time (e.g., older than one year). In another example, the embedding module 212 may update the conversion table to remove the contribution from an online activity after a predetermined quantity of new online activities were received by the online security analysis system 150.

In some embodiments, the online activity analysis model 215 receives one or more of an online activity or an embedding vector for the activity. Based on the received online activity or the embedding vector, the online activity analysis model 215 determines a likelihood that the received activity is unauthorized. The online activity analysis model 215 is trained based on past received online activities that were deemed to be unauthorized or legitimate. The online activity analysis model 215 analyzes the online activities, in part, by converting categorical values of one or more categorical features identified in the activities to numerical values. The numerical values generated by the conversion module 210 for the categorical values provide additional information that cannot be derived simply from the categorical value itself. For example, an email address by itself may not provide a lot of information to the online activity analysis model 215 by itself. However, by converting the email address into a numerical value obtained by aggregating one or more numerical values for one or more tracked numerical features extracted from past online activities that were associated with the email address, the conversion module 210 is able to provide additional information to the online activity analysis model 215 that would not have been available otherwise.

As part of the generation of the online activity analysis model 215, the model 215 forms a training set of past online activities by identifying a positive training set of online activities that have been determined to be unauthorized. For example, a learning module that is included in the online security analysis module 153 (e.g., in the online activity analysis model 215) may perform one or more techniques related to training or forming a training set. In some embodiments, the online activity analysis model 215 forms a negative training set of online activities that were determined to be legitimate. In some embodiments, the negative training set is formed by including online activities that were not determined to be unauthorized after a predetermined amount of time has lapsed.

The online activity analysis model 215 may use supervised machine learning to train, such as with one or more of embedding vectors or feature vectors of the positive training set and the negative training set serving as the inputs. Different machine learning techniques—such as linear support vector machine (linear SVM), boosting for other algorithms (e.g., AdaBoost), neural networks, logistic regression, naïve Bayes, memory-based learning, random forests, bagged trees, decision trees, boosted trees, or boosted stumps—may be used in different embodiments. The online activity analysis model 215, when applied to the embedding vector or the feature vector generated for an online activity, outputs an indication of whether the online activity is fraudulent, such as a Boolean yes/no estimate, or a scalar value representing a probability.

In some embodiments, a validation set is formed of additional online activities, other than those in the training sets. The online activity analysis model 215 applies the validation set to quantify the accuracy of the online activity analysis model 215. Common metrics applied in accuracy measurement include: Precision=TP/(TP+FP) and Recall=TP/(TP+FN). In regards to calculations described herein for precision or recall, "TP" may indicate true positives, "FP" may indicate false positives, and "FN" may indicate false negatives. In some cases, precision is how many the online activity analysis model 215 correctly predicted (e.g., true positives) out of the total it predicted (e.g., TP+FP). In some cases, recall is how many the online activity analysis model 215 correctly predicted (e.g., true positives) out of the total number of online activities that were unauthorized (e.g., TP+FN). In some cases, an F score unifies precision and recall into a single measure: F-score=2*PR/(P+R). In regards to calculations described herein for an F-score, "P" may indicate a precision calculation and "R" may indicate a recall calculation. In some embodiments, the online activity analysis model 215 iteratively re-trains until the occurrence of a stopping condition, such as the accuracy measurement indication that the model is sufficiently accurate, or a number of training rounds having taken place.

In other embodiments, the online activity analysis model 215 uses unsupervised training such as a neural network autoencoder, isolation forest, principal component analysis, k-means clustering, nearest neighbor clustering, or other techniques for unsupervised training.

In some embodiments, the online activity analysis model 215 periodically re-trains using newly acquired information. For instance, the online activity analysis model 215 may re-train every six months using a training set that includes online activities received after the latest re-training of the online activity analysis model 215 was performed.

Figure 3:
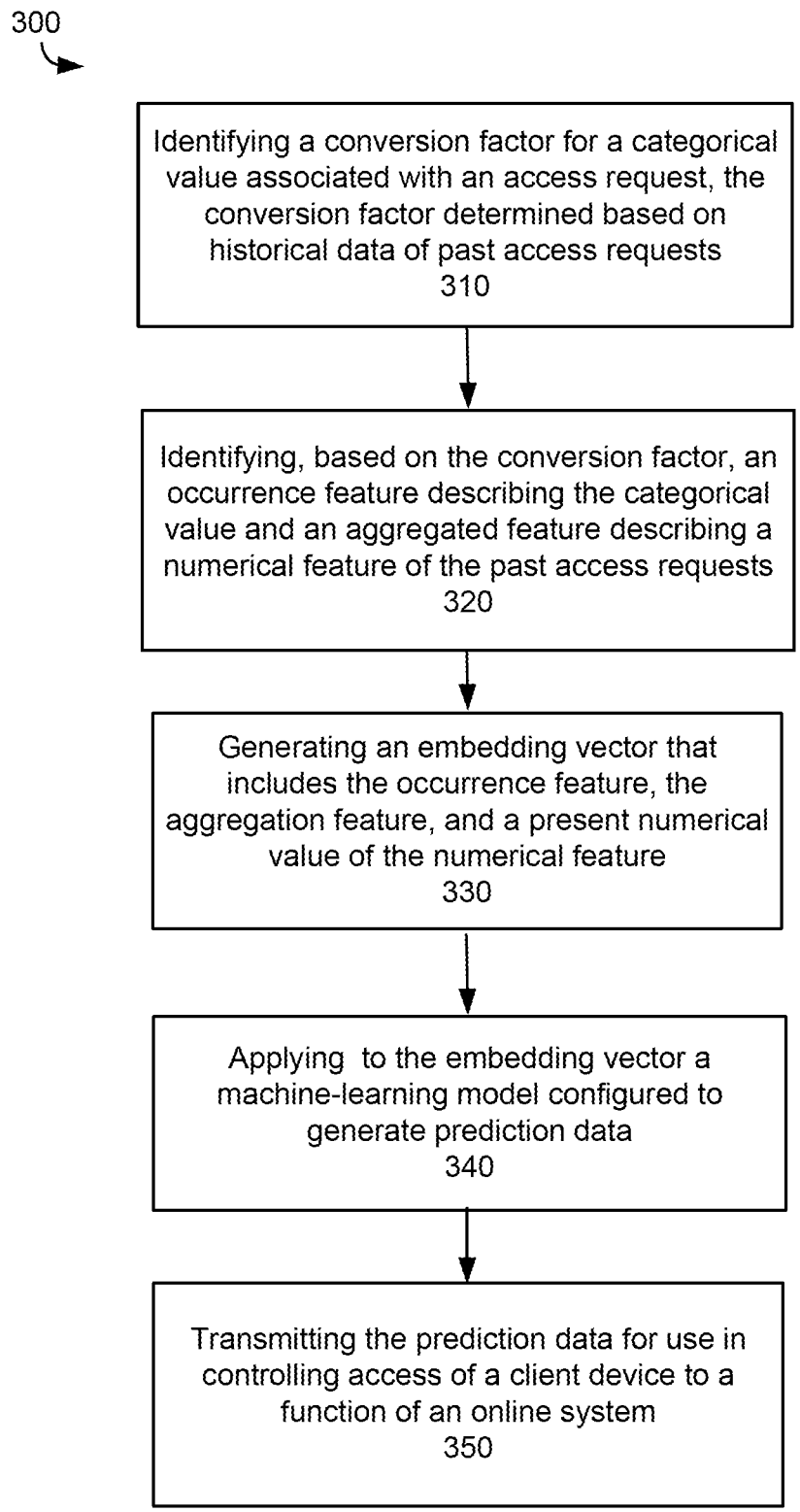
FIG. 3 illustrates a flow diagram of a process for generating prediction data associated with an online activity, according to some embodiments.

FIG. 3 illustrates a flow diagram of a process 300 for generating prediction data associated with an online activity, according to some embodiments. In some embodiments, such as described in regards to FIGS. 1-2, a computing device executing an online security analysis system may implement operations described in FIG. 3, by executing suitable program code. For illustrative purposes, the process 300 is described with reference to the examples depicted in FIGS. 1-2. Other implementations, however, are possible.

At block 310, the process 300 involves identifying a set of conversion factors for a categorical value associated with an online activity, such as an access request. For example, the access request may be from a client device to an online system, such as from the client device 140 to the online system 130. In some cases, one or more conversion factors in the set is determined based on historical data associated with previous online activities, such as past access requests that have the categorical value. For instance, the conversion table included in the online security analysis module 153 may include a conversion factor that is generated, such as by the conversion module 210, based on historical data associated with online activities previously received by the online security analysis system 150. The historical data, for instance, may indicate one or more counted categorical values or aggregated numerical values that are associated with the categorical value of the received access request. Additionally or alternatively, the historical data may include online activity information that describes categorical or numerical values from which counted or aggregated values may be calculated. In some cases, the conversion module 210 may identify a set of one or more conversion factors that describe the categorical value, such as a conversion factor that describes a count for a particular email address and an additional conversion factor that describes an aggregated value for the particular email address. In addition, the conversion module 210 may determine that an identified conversion factor describes a modification (e.g., substitution, concatenation) that may be applied to the categorical value, such as by substituting the particular email address with the example count, with the example aggregated value, or with a vector that includes (at least) the example count and aggregated value.

At block 320, the process 300 involves identifying multiple features, such as features describing data associated with the access request or the past access requests. An occurrence feature may describe the categorical value that is associated with the access request. An aggregated feature may describe a numerical feature of the past access requests. For example, the occurrence feature may describe one or more of a counted categorical value or an occurrence ratio that are associated with the categorical value. The counted categorical value may indicate a count of how many occasions the past access request included the categorical value. The occurrence ratio may describe a ratio of counted occurrences for the categorical value, such as a ratio of counted unauthorized occurrences of the categorical value with total counted occurrences of the categorical value. In addition, the occurrence ratio may describe a ratio between a quantity of occurrences in which a categorical value, e.g., a particular email address, was included in past access requests that were identified as being unauthorized and a total count of occurrences of the categorical value in the past access requests. As an additional example, the aggregated feature may describe one or more of an aggregated numerical value or an aggregated value ratio that are associated with a numerical feature that is in multiple ones of the past access requests. The aggregated numerical value may describe a combination of past values for the numerical feature, e.g., a sum of IP distances. The aggregated value ratio may describe a ratio between portions of the aggregated numerical value for the numerical feature. For example, the aggregated value ratio may describe a ratio of the aggregated numerical value for past access request that were identified as being unauthorized and a total aggregated numerical value from the past access requests. In some cases, the online security analysis module 153 may store one or more values for the identified features, such as in the conversion table or the online activity databased 155. In additional or alternative aspects, the online security analysis module 153 may generate one or more features based on stored data. For example, the conversion module 210 may store data describing one or more of the counted categorical value, the aggregated numerical value, the occurrence ratio, or the aggregated value ratio. In addition, the conversion module 210 may generate one or more of the counted categorical value, the aggregated numerical value, the occurrence ratio, or the aggregated value ratio based on online activity information that describes categorical values and numerical values in the past access requests.

At block 330, the process 300 involves generating an embedding vector. The embedding vector may include one or more of the occurrence feature or the aggregated feature. In some cases, the embedding vector may include a present numerical value of the numerical feature for the received online activity. For instance, the present numerical value may be associated with the access request, such as the value of the numerical feature in the access request received by the online security analysis module 153. In some cases, the embedding module 212 generates the embedding vector, such as by analyzing online activity information describing one or more of the access request or the past access requests. For instance, the generated embedding vector may include one or more values (e.g., vector values) that respectively represent the counted categorical value, the aggregated numerical value, the occurrence ratio, or the aggregated value ratio. In addition, the generated embedding vector may include at least one value that represents the present numerical value (e.g., for the numerical feature that is aggregated in the aggregated feature). In some cases, the embedding vector may include values that encode characteristics of one or more online activities, such as described in regards to FIG. 2.

At block 340, the process 300 involves applying a machine-learning model to the embedding vector. The machine-learning model may be configured to generate prediction data associated with the access request, such as a prediction output based on the embedding vector. For example, the online activity analysis model 215 may be applied to the embedding vector. Based on the embedding vector, the online activity analysis model 215 may determine a likelihood of whether the access request is unauthorized or legitimate. In addition, the online activity analysis model 215 may generate prediction data that describes the determined likelihood. For instance, the prediction data may include a value (e.g., a Boolean value, "yes/no" value) indicating that the access request is likely to be unauthorized. Additionally or alternatively, the prediction data may indicate a value (e.g., a percentage, a value in a 0-1 range) that indicates a probability that the access request is unauthorized. In regards to block 340, the prediction data is described as indicating a likelihood of an access request being unauthorized, but other embodiments are possible, such as prediction data that indicates a likelihood of an access request being legitimate, or additional indications related to an online activity.

At block 350, the process 300 involves transmitting the prediction data to an online system, such as the online system 130. In some cases, the prediction data is transmitted for use in controlling access to a function of the online system, such as controlling access of a client device to the function. For instance, based on the prediction data associated with the access request, the online system 130 may control access of the client device 140 to a function of the online system 130. In some cases, controlling access may include permitting the client device to interact with the function, such as by providing data, receiving a download, or performing a transaction to purchase content. In addition, controlling access may include preventing the client device from interacting with the function, such as by blocking additional requests, providing an error message, or dropping a connection to the client device. In some cases, the online system may generate additional data describing controlled access, such as by sending an alert to a customer describing potentially unauthorized online activity on the customer's account.

Process for Analyzing Online Activities

Figure 4:
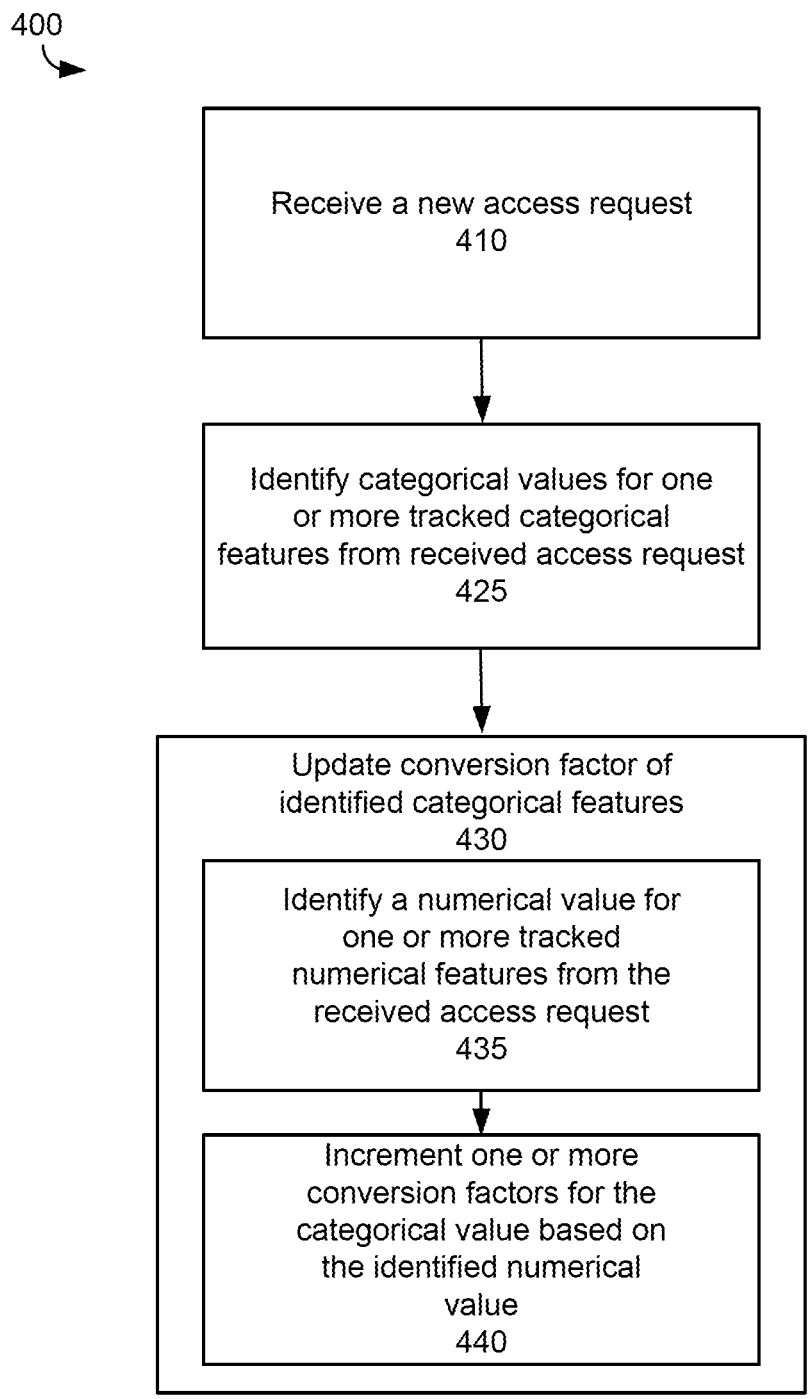
FIG. 4 illustrates a flow diagram of a process for updating a conversion factor to convert a categorical feature to a numerical feature, according to some embodiments.

FIG. 4 illustrates a flow diagram of a process 400 for updating a conversion factor to convert a categorical value to a numerical value, according to some embodiments. The categorical values may be converted to a numerical value to be included in an embedding vector input to a trained model to determine a certain characteristic of the categorical value. For example, the categorical value may be converted to a numerical value to enable a trained model to determine a likelihood that an online activity associated with the categorical value is an unauthorized online activity. In some embodiments, such as described in regards to FIGS. 1-3, a computing device executing an online security analysis system may implement operations described in FIG. 4, by executing suitable program code. For illustrative purposes, the process 400 is described with reference to the examples depicted in FIGS. 1-3. Other implementations, however, are possible.

At block 410, the process 400 involves receiving an online activity, such as a new access request. For example, the online security analysis system 150 may receive, from an online system 130, a new access request. In some embodiments, the access request may be received in response to a user performing an action (e.g., requesting access to a website function, completing a purchase, providing login information) in the online system 130. In other embodiments, the access request may be received in response to the user performing an action in a third-party system that uses some functionality provided by the online system 130. In some embodiments, the update of the categorical value may be performed in real-time. For example, the update of the conversion factor for the categorical value may be performed as new online activities are received from an online system. In other embodiments, the update of the conversion factor may be performed during a training phase. For example, one or more conversion factors may be updated on a daily or weekly basis based the new online activities that were received during a prior day or week.

At block 425, the process 400 involves identifying a categorical value for a tracked categorical feature. For example, the conversion module 210 identifies categorical values for one or more tracked categorical features from the received access request. At block 430, the process 400 involves updating a set of conversion factors for each respective identified categorical value. In some embodiments, the conversion module 210 updates one or more conversion factors that are associated with the identified categorical values. For instance, a categorical feature may be an email address. In this example, the conversion module 210 may identify an email address associated with the received access request and update a set of conversion factors for the identified email address. For instance, the conversion module 210 may update one or more of a first conversion factor that describes a currency amount associated with the email address, a second conversion factor that describes a shipping distance associated with the email address, or a third conversion factor that describes an occurrence count of the email address.

Block 430 includes block 435 and block 440. At block 435, the process 400 involves identifying a numerical value for a tracked numerical feature associated with the categorical feature. For example, to update the conversion factors for the categorical value, the conversion module 210 identifies a numerical value for one or more tracked numerical features associated with the categorical feature in the access request. The numerical value could include, for example, a currency amount specified in the access request, such as a currency amount measured in dollars, euros, or another suitable currency type.

At block 440, the process 400 involves incrementing (or otherwise modifying) one or more conversion factors for the categorical value based on the identified numerical value. For example, the conversion module 210 updates the conversion factors for the identified categorical values by modifying the conversion factors based on the identified numerical value. For instance, if a tracked numerical feature is a dollar amount specified in the access request, the conversion module 210 identifies the dollar amount associated with the received access request. In addition, the conversion module 210 modifies the conversion factor of total dollar amount for the identified categorical values (e.g., email address or IP address), such as by summing the identified dollar amount with an aggregated dollar amount value. Similarly, if the tracked numerical feature is a distance between a billing address and a shipping address, the conversion module 210 identifies the distance associated with the received access request and modifies the conversion factor of total distance for the identified categorical values (e.g., email address or IP address) based on the identified distance. In some cases, modifying the conversion factor can include aggregating the access request's numerical value with additional numerical values of additional online activities that are associated with a particular categorical value. For example, the conversion module 210 may sum (or otherwise aggregate) the currency value of a transaction described by an access request for a particular email address with additional currency values of additional access requests that are associated with the particular email address.

In some embodiments, each categorical value may have multiple conversion factors based on different tracked numerical features. For example, a categorical value may have a first conversion factor based on a total currency amount, and a second conversion factor based on a shipping distance between a shipping address and a billing address. Moreover, each categorical value may have additional conversion factors based on a ratio or combination of two or more tracked numerical features. For example, a categorical value may have a conversion factor based on a total shipping distance divided by a total count associated with the categorical value.

In some embodiments, instead of updating the conversion factors each time a new online activity is received, the conversion module 210 updates the conversion factors periodically. For example, once every time period (e.g., once per day), the conversion module 210 calculates the conversion factors by counting a number of times a categorical value was present in online activities received within a predetermined time window. In some cases, the conversion module 210 updates the conversion factors in response to receiving an indication about an online activity, such as an indication that an online activity is unauthorized or an indication that a threshold quantity of online activities have been received.

In some cases, updating a conversion factor includes converting a categorical value to an additional value. For instance, an online security analysis system may convert an email address to another data value, such as by calculating a hash value for the email address, or performing any other suitable technique for determining a data representation of a categorical value. In some embodiments, the converted values may be provided to a model as an input or as training data. For instance, a data value of a converted email address may be provided to the online activity analysis model 215 as training data or as an input (e.g., "live" data).

Figure 5:
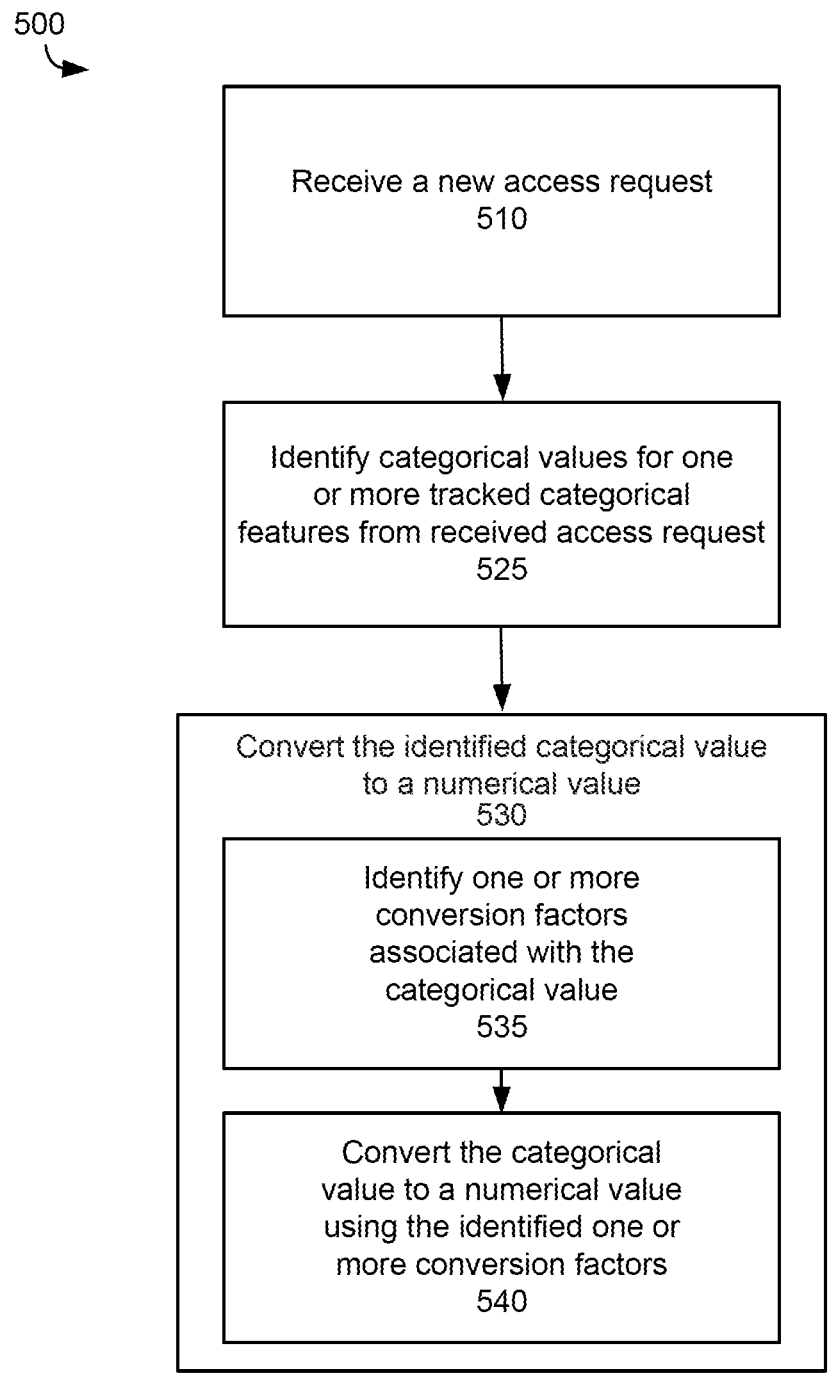
FIG. 5 illustrates a flow diagram of a process for converting a categorical feature to a numerical feature, according to some embodiments.

FIG. 5 illustrates a flow diagram of a process 500 for converting a categorical value to a numerical value, according to some embodiments. Categorical values may be converted to numerical values prior to evaluating the access request containing the categorical values using a trained model. The numerical values may be used, for example, to generate an embedding vector or a feature vector to be used in conjunction with the trained model. For example, an online security analysis system may use a trained model to determine a likelihood that an online activity associated with a categorical value (e.g., an IP address or an email address) is unauthorized. In some embodiments, such as described in regards to FIGS. 1-4, a computing device executing an online security analysis system implements operations described in FIG. 5, by executing suitable program code. For illustrative purposes, the process 500 is described with reference to the examples depicted in FIGS. 1-4. Other implementations, however, are possible.

At block 510, the process 500 involves receiving an online activity, such as a new access request. For example, the online security analysis system 150 receives, from an online system 130, a new access request. In some embodiments, the access request is received in response to a user performing an action (e.g., completing a purchase) in the online system 130. In other embodiments, the access request is received in response to the user performing an action in a third-party system that uses some functionality provided by the online system 130.

At block 525, the process 500 involves identifying a categorical value for a tracked categorical feature. For example, the online security analysis system 150 identifies categorical values for one or more tracked categorical features from the received access request. In some embodiments, the tracked categorical features change depending on the application. For example, if an online security analysis system is configured to determine a likelihood that an email message is a phishing attack, the online security analysis system tracks a first set of categorical features (e.g., a sender email address). In addition, if the online security analysis system is configured to determine a likelihood that a credit card transaction is an unauthorized one, the online security analysis system tracks a second set of categorical features (e.g., a credit card number, and a location of the transaction).

At block 530, the process 500 involves converting an identified categorical value to a numerical value. For example, the conversion module 210 converts the identified categorical values to numerical values. Block 530 includes block 535 and block 540. At block 535, the process 500 involves identifying a conversion factor associated with the categorical value, such as a conversion factor for converting the categorical value to a numerical value. For example, the conversion module 210 may identify a set of one or more conversion factors associated with the categorical value. In some embodiments, the conversion module 210 may provide a list of available conversion factors and the online security analysis system 150 selects the desired conversion factors to convert the categorical value into a numerical value. The list may include, for instance, one or more conversion factors respectively related to a shipping distance, an IP distance, a count of occurrences, a ratio of values as described herein, or other suitable conversion factors.

At block 540, the process 500 involves converting the categorical value to a numerical value. Based on the identified conversion factors, for instance, the conversion module 210 converts the categorical value into one or more numerical values, such as a conversion of an email address to an aggregated count of occurrences of the email address. In some embodiments, the conversion module 210 outputs a vector for the categorical value. The vector may include multiple elements, each associated with one or more categorical values. For example, the conversion module 210 may output a vector having one element for each of the available conversion factors for the categorical value.

In some cases, an embedding vector may be calculated for a received online activity. Based on the embedding vector, a model, such as the online activity analysis model 215, may determine a likelihood of the access request being unauthorized. In some embodiments, the embedding vector may include (or represent) values that are generated based on one or more conversion factors. For instance, the embedding vector may include a numerical value for a categorical value converted via a conversion factor (e.g., a numerical value of a converted email address). In additional or alternative aspects, the embedding vector may include a numerical value that is based on an incremented conversion factor, such as a conversion factor based on an aggregation of multiple numerical values.

Figure 6:
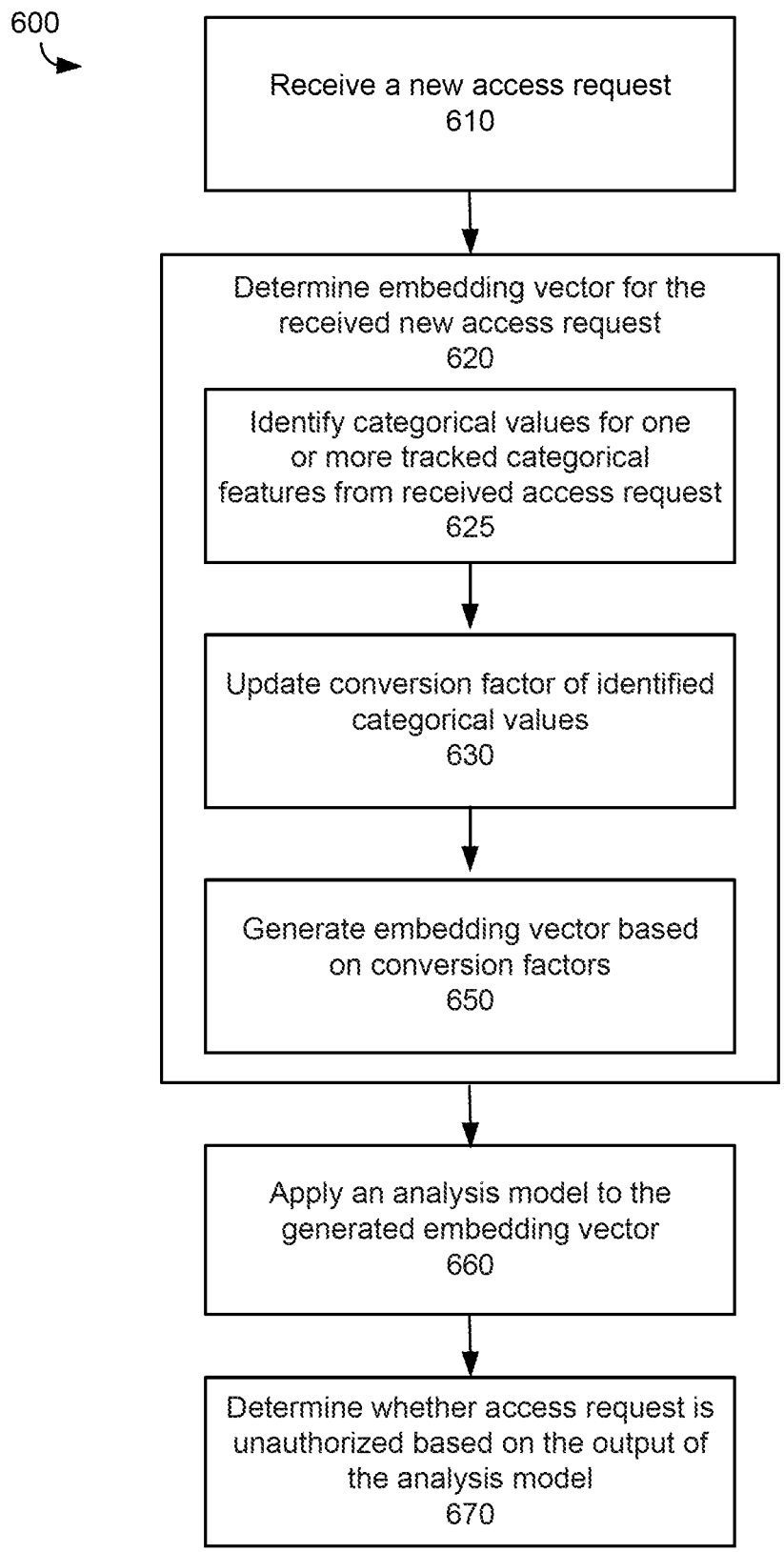
FIG. 6 illustrates a flow diagram of a process for determining a likelihood of an online activity being unauthorized, according to some embodiments.

FIG. 6 illustrates a flow diagram of a process 600 for determining a likelihood of an online activity being unauthorized, according to some embodiments. In some embodiments, such as described in regards to FIGS. 1-5, a computing device executing an online security analysis system implements operations described in FIG. 6, by executing suitable program code. For illustrative purposes, the process 600 is described with reference to the examples depicted in FIGS. 1-5. Other implementations, however, are possible.

At block 610, the process 600 involves receiving an online activity, such as a new access request. For example, the online security analysis system 150 receives, from an online system 130, a new access request. In some embodiments, the access request is received in response to a user performing an action (e.g., completing a purchase) in the online system 130. In other embodiments, the access request is received in response to the user performing an action in a third-party system that uses some functionality provided by the online system 130.

At block 620, the process 600 involves determining an embedding vector for the received access request. For example, the embedding module 212 determines an embedding vector for the received new access request. At block 625, the process 600 involves identifying a categorical value for a tracked categorical feature of the received access request. For example, to determine the embedding vector, the embedding module 212 identifies categorical values for one or more tracked categorical features from the received access request.

At block 630, the process 600 involves updating a conversion factor for an identified categorical value. In some embodiments, the embedding module 212 updates a conversion factor for the identified categorical values. For instance, a categorical feature may be an email address. In this example, the embedding module identifies an email address associated with the received access request and updates the conversion factor for the identified email address. In some embodiments, to update the conversion factor, the embedding module 212 increments a count associated with the identified categorical values.

In some embodiments, instead of updating the conversion factors each time a new online activity is received, the embedding module 212 updates the conversion factors periodically. For example, once every time period (e.g., once per day), the embedding module 212 calculates the conversion factors by counting a number of times a categorical value was present in online activities received within a predetermined time window, such as a predetermined time window associated with the time period. In some cases, the embedding module 212 calculates the conversion factors in response to receiving an indication about an online activity, such as an indication that an online activity is unauthorized or an indication that a threshold quantity of online activities have been received.

At block 650, the process 600 involves generating an embedding vector. The embedding vector may be based on the conversion factor for the identified categorical value. For example, the embedding module 212 generates an embedding vector based on the conversion factors for the identified categorical values. That is, the embedding module retrieves the conversion factors for the identified categorical values of each of the tracked categorical features and generates a vector based on the retrieved conversion factors. In the case when there exists no entry for the identified categorical value (i.e., there was no prior observation of that categorical value), the value in the vector is imputed based on previous values for first-time observations. Then a new entry is created to store the conversion factors.

At block 660, the process 600 involves applying an online activity analysis model to the generated embedding vector. Based on the generated embedding vector, the online activity analysis model may determine a likelihood that the access request associated with the embedding vector is unauthorized. For example, the online security analysis module 153 applies the online activity analysis model 215 to the generated embedding vector to determine a likelihood that the access request is unauthorized. At block 670, the process 600 involves determining whether the access request associated with the embedding vector is suspicious. Based on the determined likelihood, for instance, the online security analysis module 153 determines whether the access request is suspicious. In some embodiments, if the likelihood that the access request is unauthorized is above a security threshold value, the online security analysis module 153 determines that the access request is suspicious and the online security analysis system 150 sends a notification to the online system 130 indicating that the access request is suspicious or unauthorized.

By using a separate model to generate the embedding vectors and to determine the likelihood that an online activity is unauthorized, the online security analysis system 150 may be able to reuse the online activity analysis model 215 and reduce the frequency at which the online activity analysis model should be re-trained to maintain a certain level of accuracy. Instead of re-training the online activity analysis model 215, the conversion tables of the embedding module 212 are updated to reflect the newly received data. Since updating the conversion factors may be less complex and resource intensive as re-training the online activity analysis model 215 and may be less likely to problematically reinforce model behavior, this process beneficially allows the online security analysis system 150 to reduce the computational resources used for keeping the online activity analysis model accurate and allows the online security analysis system 150 to more efficiently incorporate feedback received from the online system 130 for recently received online activities.

In some cases, a conversion factor may be updated multiple times. For example, a conversion factor may be updated responsive to information indicating that an online activity that had previously been categorized is re-categorized. For example, the online security analysis system 150 may receive an indication that an online activity previously categorized as unauthorized (or legitimate) is re-categorized as legitimate (or unauthorized). In some cases, one or more conversion factors are updated based on the received indication.

Figure 7:
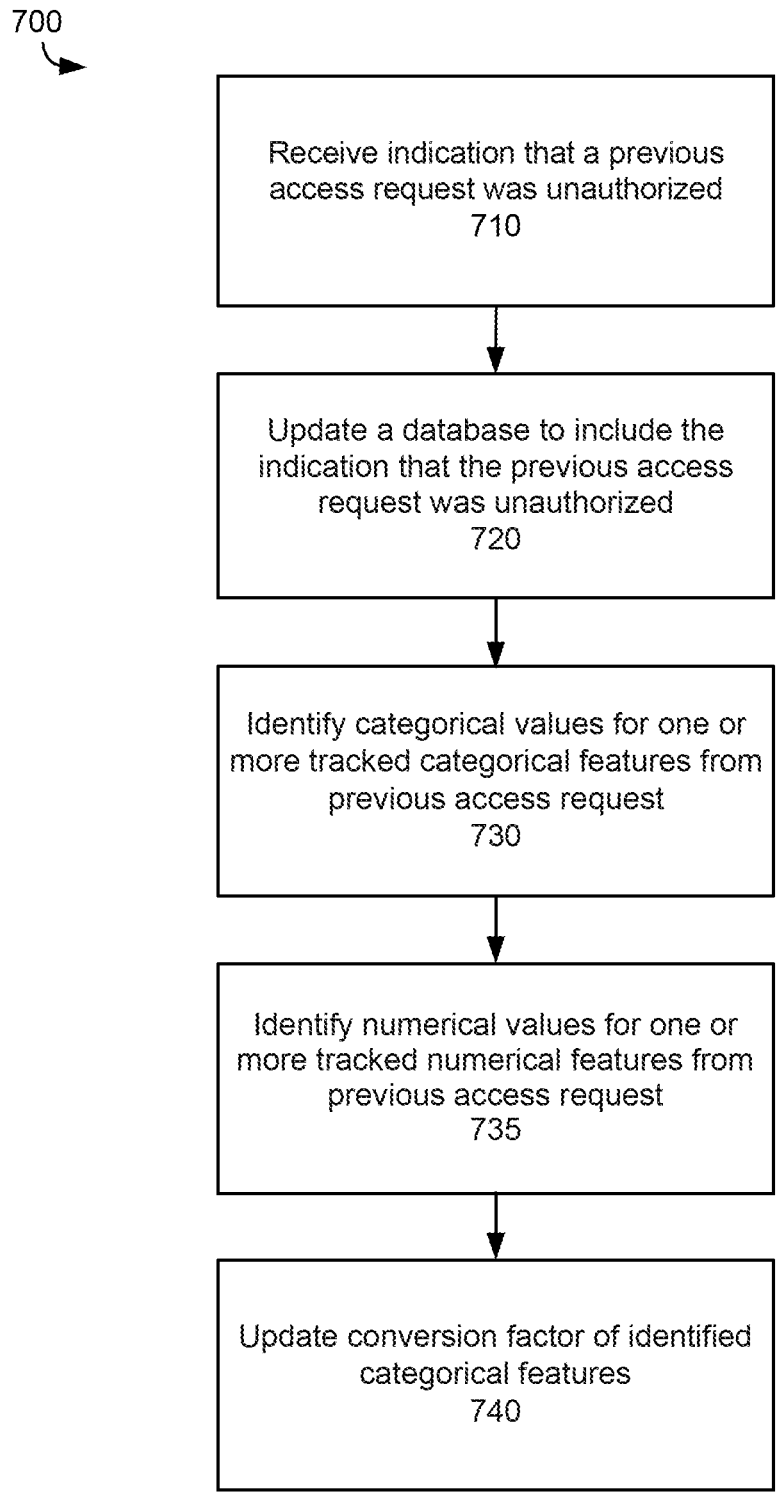
FIG. 7 illustrates a flow diagram of a process for updating a conversion factor based on feedback received from an online system or a third-party system, according to some embodiments.

FIG. 7 illustrates a flow diagram of a process 700 for updating a conversion factor based on feedback received from an online system or a third-party system, according to some embodiments. In some embodiments, such as described in regards to FIGS. 1-6, a computing device executing an online security analysis system implements operations described in FIG. 7, by executing suitable program code. For illustrative purposes, the process 700 is described with reference to the examples depicted in FIGS. 1-6. Other implementations, however, are possible.

At block 710, the process 700 involves receiving an indication that an online activity, such as an access request, is unauthorized. The indication may describe a previous online activity, such as an access request received at an earlier point in time. In additional or alternative aspects, the indication may describe an online activity that had previously been indicated as legitimate (e.g., not unauthorized). For example, the online security analysis system 150 may receive an indication, such as from an online system 130 or a third-party system, that a previously received access request was unauthorized. In some embodiments, the online system 130 only sends feedback to the online security analysis system 150 if an online activity is deemed to be unauthorized. For example, if a customer initiates a charge back, the online system 130 sends a message to the online security analysis system 150 indicating that the online activity associated with the charge back was unauthorized. In this embodiment, if an indication that an online activity was unauthorized is not received from the online system 130, the online security analysis system 150 assumes that the online activity was not unauthorized. In other embodiments, the online system 130 only sends feedback to the online security analysis system 150 if the determination of the online security analysis system 150 was incorrect. For example, if the online security analysis system 150 determines that an online activity has a high likelihood of being unauthorized, the online system 130 sends feedback to the online security analysis system if the online activity is deemed to be legitimate. Conversely, if the online security analysis system 150 determines that an online activity has a low likelihood of being unauthorized, the online system 130 sends feedback to the online security analysis system if the online activity is deemed to be unauthorized. In yet other embodiments, the online system 130 sends feedback to the online security analysis system 150 for every online activity analyzed by the online security analysis system 150.

At block 720, the process 700 involves updating online activity information, such as an online activity database, to include the indication that the online activity is unauthorized. For instance, upon receiving feedback from the online system 130 regarding a previously received access request, the online security analysis system 150 updates the online activity database 155 to include the indication that the previously received access request was unauthorized. In some embodiments, upon the expiration of a predetermined time period, if feedback is not received from the online system, online security analysis system 150 updates the online activity database to indicate that the previously received access request was not unauthorized. In other embodiments, upon the expiration of the predetermined time period, if feedback is not received from the online system, online security analysis system 150 updates the online activity database to indicate that the prior prediction of whether the access request was unauthorized or not was likely to be correct.

At block 730, the process 700 involves identifying a categorical value for a tracked categorical feature for the access request. For example, upon receiving the feedback from the online system 130 regarding the previously received access request, the embedding module 212 identifies one or more categorical values for one or more tracked categorical features from the previously received access request. The identified categorical values may include, for example, an email address associated with the previously received access request.

At block 735, the process 700 involves identifying a numerical value for a tracked numerical feature for the access request. For example, upon receiving the feedback from the online system 130 regarding the previously received access request, the embedding module 212 identifies one or more numerical values for one or more tracked numerical features from the previously received access request. The identified numerical values may include, for example, a currency amount associated with the previously received access request.

At block 740, the process 700 involves updating a conversion factor for the identified categorical feature. For instance, the embedding module 212 updates the conversion factors associated with the identified categorical values. In particular, if the feedback indicates that the previously received access request was unauthorized, the embedding module 212 increases a first conversion factor that is based on the frequency of occurrences that the identified categorical value (e.g., a particular email address) was included in unauthorized online activities. In some cases, updating one or more conversion features for an identified categorical feature includes updating a conversion factor associated with a numerical value, such as an aggregated numerical value. For example, if the feedback indicates that the previously received access request was unauthorized, the embedding module 212 increases a second conversion factor that is based on an aggregated numerical value (e.g., currency amounts) associated with the identified categorical value that is included in unauthorized online activities.

In some embodiments, if feedback is not received within the predetermined amount of time, the embedding module 212 decreases the first example conversion factor that is based on the frequency of occurrences that the identified categorical value was included in unauthorized online activities.

In some embodiments, the update of the conversion factors may be performed periodically, such as once per period of time (e.g., daily, weekly, hourly). Additionally or alternatively, the update of the conversion factors may be performed in real-time, such as once per online activity or predetermined quantity of online activities. Furthermore, the update of the conversion factors may be performed in response to receiving an indication about an online activity, such as data indicating an updated classification for an access request, e.g., an updated classification indicating that an access request classified as legitimate (or unauthorized) is unauthorized (or legitimate). Yet further, the update of the conversion factors may be performed in response to receiving a threshold quantity of online activities that are associated with a particular categorical value. In some cases, the threshold quantity of online activities may be received within a threshold amount of time. For example, if the online security analysis system 150 receives, within an amount of time, a quantity of access requests that are all associated with a particular email address, and the quantity and/or the amount of time satisfy a security threshold that is associated with a security alert for "potential account hijacking," the online security analysis system 150 may perform an update of the conversion factors based on the received access requests. In some cases, the threshold quantity of online activities may be one. For instance, in response to receiving one online activity that is associated with a particular categorical value, e.g., an email address previously associated with a security alert, the conversion factors may be updated.

During an update of the conversion factors, the embedding module 212 may identify online activities associated with a particular categorical value. In addition, the embedding module 212 may identify a quantity or ratio of online activities that were unauthorized, and updates the conversion factor of the categorical value based on the determined quantity or ratio. Additionally or alternatively, during an update, the embedding module 212 may identify online activities with no feedback received from the online system after the predetermined amount of time, and may update the entries (e.g., quantities, ratios) associated with those online activities to indicate that the online activities were legitimate. In the above example involving access requests that exceed the security threshold, the embedding module 212 may update one or more conversion factors related to, for instance, a counted categorical value, an occurrence ratio, an aggregated numerical value, or an aggregated value ratio that are associated with the particular email address.

Figure 8:
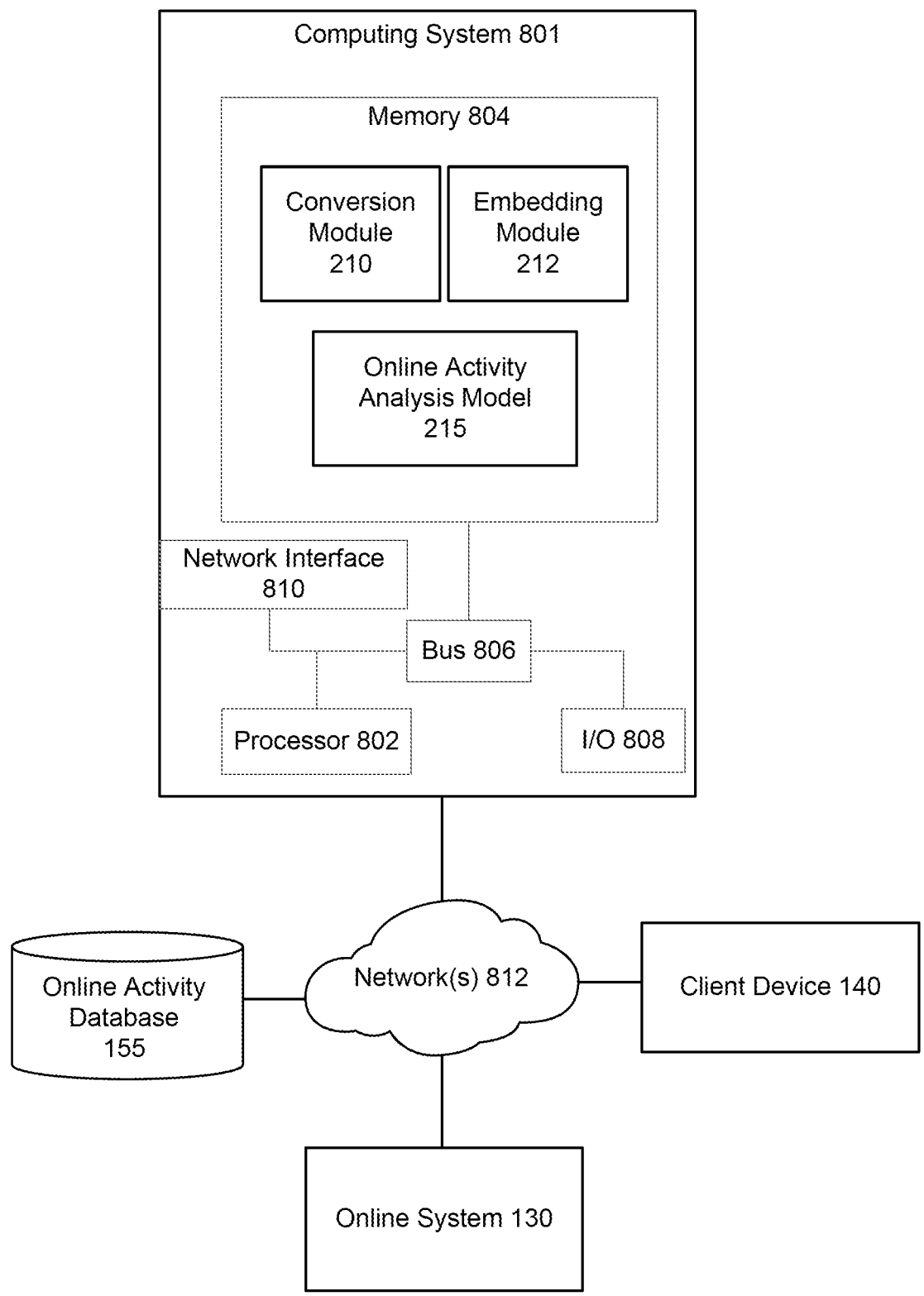
FIG. 8 illustrates a block diagram depicting an example of a computing system for implementing an online security analysis system, according to some embodiments.

Any suitable computing system or group of computing systems can be used for performing the operations described herein. For example, FIG. 8 is a block diagram depicting a computing system that is capable of implementing an online security analysis system, according to certain embodiments.

The depicted example of a computing system 801 includes one or more processors 802 communicatively coupled to one or more memory devices 804. The processor 802 executes computer-executable program code or accesses information stored in the memory device 804. Examples of processor 802 include a microprocessor, an application-specific integrated circuit ("ASIC"), a field-programmable gate array ("FPGA"), or other suitable processing device. The processor 802 can include any number of processing devices, including one.

The memory device 804 includes any suitable non-transitory computer-readable medium for storing the conversion module 210, the embedding module 212, the online activity analysis model 215, and other received or determined values or data objects. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 801 may also include a number of external or internal devices such as input or output devices. For example, the computing system 801 is shown with an input/output ("I/O") interface 808 that can receive input from input devices or provide output to output devices. A bus 806 can also be included in the computing system 801. The bus 806 can communicatively couple one or more components of the computing system 801.

The computing system 801 executes program code that configures the processor 802 to perform one or more of the operations described above with respect to FIGS. 1-7. The program code includes operations related to, for example, one or more of the conversion module 210, the embedding module 212, the online activity analysis model 215, or other suitable applications or memory structures that perform one or more operations described herein. The program code may be resident in the memory device 804 or any suitable computer-readable medium and may be executed by the processor 802 or any other suitable processor. In some embodiments, the program code described above, the conversion module 210, the embedding module 212, and the online activity analysis model 215 are stored in the memory device 804, as depicted in FIG. 8. In additional or alternative embodiments, one or more of the conversion module 210, the embedding module 212, the online activity analysis model 215, or the program code described above are stored in one or more memory devices accessible via a data network, such as a memory device accessible via a cloud service.

The computing system 801 depicted in FIG. 8 also includes at least one network interface 810. The network interface 810 includes any device or group of devices suitable for establishing a wired or wireless data connection to one or more data networks 812. Non-limiting examples of the network interface 810 include an Ethernet network adapter, a modem, and/or the like. The computing system 801 is able to communicate with one or more of the online activity database 155, the client device 140, or the online system 130 using the network interface 810. Although FIG. 8 depicts the online activity database 155 as being connected to the computing system 801 via the networks 812, other embodiments are possible, including the online activity database 155 residing as a storage component (e.g., software component, hardware component) in the computing system 801.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

What is claimed is:

1. A method implemented by an online security analysis system, the method comprising:
    identifying, by the online security analysis system, a set of conversion factors for a categorical value that is associated with an access request from a client device to an online system, wherein the set of conversion factors is determined based on historical data associated with past access requests having the categorical value;
    identifying, based on the set of conversion factors, an occurrence feature related to occurrences of the categorical value and an aggregated feature related to aggregated values of a numerical feature of the past access requests;
    generating, by the online security analysis system, an embedding vector that includes the occurrence feature, the aggregated feature, and a present numerical value of the numerical feature, the present numerical value being associated with the access request;
    modifying, by the online security analysis system, the set of conversion factors to include i) a combination of the present numerical value and an aggregated value ratio included in the aggregated feature and ii) a combination of the categorical value with an occurrence ratio included in the occurrence feature;
    applying, by the online security analysis system, a machine-learning model to the embedding vector, the machine-learning model configured to generate prediction data associated with the access request based on the embedding vector; and
    transmitting the prediction data, by the online security analysis system, to the online system for use in controlling access of the client device to a function of the online system.

2. The method of claim 1, wherein the occurrence feature includes a counted categorical value, and wherein the aggregated feature includes an aggregated numerical value.

3. The method of claim 1, wherein modifying the set of conversion factors is performed based on one or more of: (i) determining that a predetermined period of time has passed, (ii) responsive to receiving an updated classification for one of the past access requests, or (iii) responsive to receiving a threshold quantity of access requests.

4. The method of claim 1, further comprising:
    modifying (i) the occurrence feature based on the combination of the categorical value with the occurrence ratio and (ii) the aggregated feature based on the combination of the present numerical value and the aggregated value ratio;
    receiving, by the online security analysis system, an additional access request from the client device to the online system, the additional access request having the categorical value and an additional numerical value for the numerical feature;
    generating, by the online security analysis system, an additional embedding vector that includes the modified occurrence feature, the modified aggregated feature, and the additional numerical value; and
    applying, by the online security analysis system, the machine-learning model to the additional embedding vector to generate additional prediction data associated with the additional access request.

5. The method of claim 1, wherein modifying the set of conversion factors to include the combination of the present numerical value with the aggregated value ratio includes aggregating the present numerical value with a value of the aggregated value ratio.

6. The method of claim 1, wherein the categorical value is a first value of a categorical feature, and an additional conversion factor is associated with a second value of the categorical feature.

7. The method of claim 1, wherein generating the prediction data associated with the access request further comprises:
    receiving a prediction output from the machine-learning model;
    comparing the prediction output to a security threshold; and
    generating the prediction data based on the comparison of the prediction output to the security threshold.

8. A non-transitory computer-readable storage medium having program code that is executable by a processor device to cause a computing device to perform operations, the operations comprising:
    identifying a conversion factor for a categorical value that is associated with an access request from a client device to an online system, wherein the conversion factor is determined based on historical data associated with past access requests having the categorical value;
    identifying, based on the conversion factor, an aggregated feature related to aggregated values of a numerical feature of the past access requests;
    generating an embedding vector that includes the aggregated feature and a present numerical value of the numerical feature, the present numerical value being associated with the access request;
    modifying the conversion factor to include a combination of the present numerical value and an aggregated value ratio included in the aggregated feature;
    applying a machine-learning model to the embedding vector, the machine-learning model configured to generate prediction data associated with the access request based on the embedding vector; and
    transmitting the prediction data to the online system for use in controlling access of the client device to a function of the online system.

9. The non-transitory computer-readable storage medium of claim 8, the operations further comprising:

identifying, based on an additional conversion factor for the categorical value, an occurrence feature related to occurrences of the categorical value,
wherein the generated embedding vector further includes the occurrence feature.

10. The non-transitory computer-readable storage medium of claim 8, wherein the aggregated feature includes an aggregated numerical value.

11. The non-transitory computer-readable storage medium of claim 8, wherein modifying the conversion factor is performed based on one or more of: (i) determining that a predetermined period of time has passed, (ii) responsive to receiving an updated classification for one of the past access requests, or (iii) responsive to receiving a threshold quantity of access requests.

12. The non-transitory computer-readable storage medium of claim 8, the operations further comprising:
modifying the aggregated feature based on the combination of the present numerical value and the aggregated value ratio;
receiving an additional access request from the client device to the online system, the additional access request having the categorical value and an additional numerical value for the numerical feature;
generating an additional embedding vector that includes the modified aggregated feature and the additional numerical value; and
applying the machine-learning model to the additional embedding vector to generate additional prediction data associated with the additional access request.

13. The non-transitory computer-readable storage medium of claim 8, wherein generating the prediction data associated with the access request further comprises:
receiving a prediction output from the machine-learning model;
comparing the prediction output to a security threshold; and
generating the prediction data based on the comparison of the prediction output to the security threshold.

14. A system comprising:
a processing device; and
a memory device in which instructions executable by the processing device are stored for configuring the processing device for:
identifying a conversion factor for a categorical value that is associated with an access request from a client device to an online system, wherein the conversion factor is determined based on historical data associated with past access requests having the categorical value;
responsive to one or more of (i) receiving an updated classification for the access request, or (ii) determining that a quantity of the access request combined with the past access requests exceeds a threshold quantity of access requests, modifying the conversion factor to include an occurrence feature that describes occurrences of the categorical value in the access request combined with the past access requests, wherein modifying the conversion factor to include the occurrence feature comprises combining the categorical value with an occurrence ratio for the occurrence feature;
receiving an additional access request from the client device to the online system, the additional access request having the categorical value;
generating an embedding vector that includes the occurrence feature of the modified conversion factor;
applying a machine-learning model to the embedding vector, the machine-learning model configured to generate prediction data associated with the additional access request based on the embedding vector; and
transmitting the prediction data to the online system for use in controlling access of the client device to a function of the online system.

15. The system of claim 14, the processing device further configured for:
identifying, based on an additional conversion factor for the categorical value, an aggregation feature related to aggregated values of a numerical feature of the past access requests,
wherein the generated embedding vector further includes the aggregation feature.

16. The system of claim 14, the processing device further configured for:
prior to modifying the conversion factor, generating an additional embedding vector that includes a prior occurrence feature that describes occurrences of the categorical value in the past access requests without combination with the access request; and
applying the machine-learning model to the additional embedding vector to generate additional prediction data associated with the access request,
wherein the one or more of (i) receiving an indication about the access request, or (ii) determining that a combination of the access request with the past access requests exceeds a threshold quantity of access requests are subsequent to generating the additional prediction data.

17. The system of claim 14, wherein generating the prediction data associated with the additional access request further comprises:
receiving a prediction output from the machine-learning model;
comparing the prediction output to a security threshold; and
generating the prediction data based on the comparison of the prediction output to the security threshold.

\* \* \* \* \*